United States Patent
Li et al.

(10) Patent No.: US 8,205,673 B2
(45) Date of Patent: *Jun. 26, 2012

(54) DIFFERENTIAL FILTERS FOR REMOVING WATER DURING OIL PRODUCTION

(75) Inventors: Leiming Li, Sugar Land, TX (US);
Curtis L. Boney, Houston, TX (US);
Paul R. Howard, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/643,591

(22) Filed: Dec. 21, 2009

(65) Prior Publication Data
US 2010/0132944 A1     Jun. 3, 2010

Related U.S. Application Data

(63) Continuation-in-part of application No. 11/612,007, filed on Dec. 18, 2006, now Pat. No. 7,637,320.

(51) Int. Cl.
*E21B 43/12*     (2006.01)
(52) U.S. Cl. .................................................. 166/295
(58) Field of Classification Search .................. 166/295
See application file for complete search history.

(56) References Cited

U.S. PATENT DOCUMENTS

| | | | |
|---|---|---|---|
| 4,172,066 A | 10/1979 | Zweigle et al. | |
| 6,059,034 A | 5/2000 | Rickards et al. | |
| 6,169,058 B1 * | 1/2001 | Le et al. | 507/222 |
| 6,330,916 B1 | 12/2001 | Rickards et al. | |
| 7,387,165 B2 | 6/2008 | Lopez de Cardenas et al. | |
| 7,637,320 B2 * | 12/2009 | Howard et al. | 166/295 |
| 2006/0009364 A1 | 1/2006 | Dobson, Jr. et al. | |
| 2006/0175059 A1 | 8/2006 | Sinclair et al. | |
| 2007/0017675 A1 | 1/2007 | Hammami et al. | |

FOREIGN PATENT DOCUMENTS

| | | |
|---|---|---|
| DE | 19605431 | 8/1997 |
| DE | 19605433 | 8/1997 |
| WO | 9934896 | 7/1999 |
| WO | 2006083279 | 8/2006 |

* cited by examiner

*Primary Examiner* — William P Neuder
(74) *Attorney, Agent, or Firm* — Michael Dae; Daryl Wright; Robin Nava

(57) ABSTRACT

A method of removing a partial amount of water in a well, comprises deploying a differential filter downhole; and performing a downhole operation, wherein the differential filter comprises a swellable polymer that swells after contacting water such that permeability of the differential filter is reduced by removing said partial amount of water, the swellable polymer being non-soluble in the water and/or hydrocarbon and wherein the swellable polymer comprises at least one selected from the group consisting of polyacrylic acid, polyacrylate, polymethacrylic acid, poly maleic anhydride, polyacrylamide, polyvinyl alcohol, latex, polyamide, polyester, and a co-polymer thereof.

21 Claims, 2 Drawing Sheets

DIFFERENTIAL FILTERS FOR REMOVING WATER DURING OIL PRODUCTION

CROSS-REFERENCE TO RELATED APPLICATIONS

This application is a continuation-in-part of U.S. application Ser. No. 11/612,007, filed Dec. 18, 2006 now U.S. Pat. No. 7,637,320, which is hereby incorporated by reference in its entirety.

BACKGROUND OF INVENTION

Field of the Invention

The present invention relates to methods of reducing and removing the water of a hydrocarbon well drilled through subterranean formations. More particularly it relates to such methods for selectively reducing or removing the flow of subterranean aqueous fluids into a well while maintaining its hydrocarbon production. The present invention also relates to methods of reducing and removing the water from downhole tools.

The statements in this section merely provide background information related to the present disclosure and may not constitute prior art.

During the life cycle of a hydrocarbon (oil and gas) producing well, water is often produced along with the hydrocarbons. The amount of water produced from a well tends to increase over time with a concomitant reduction of hydrocarbon production. Frequently, the production of water becomes so profuse that remedial measures have to be taken to decrease the water/hydrocarbon production ratio. The consequence of uncontrolled water production may be well abandonment.

Before hydrocarbons can be produced from subterranean formations, a production zone needs to be completed so that the well communicates with the hydrocarbon-bearing zone(s). Ideally, the hydrocarbon production zone does not communicate with the water-bearing portion(s). However, some hydrocarbon production zones may inadvertently communicate with a water-bearing zone. For example, water breakthrough may occur when a fracture goes out of zone and fractures into a water zone. Even if there is no actual initial fluid communication between the hydrocarbon production zone and the water-bearing zones of the formation, such communication may develop during the production of hydrocarbon. For example, water may be drawn upwardly from the water-bearing portion in a process known as water coning.

The production of water in hydrocarbon wells is an expensive problem. This is particularly difficult to deal with in open hole, horizontal wells, where there is no easy way to isolate and stop the water production, while allowing other parts of the well to produce hydrocarbons. The problem is especially vexing when water breaks through at the heel of the well and interferes with production of oil from places farther down in the wellbore.

Another complication from water inflow in wells relates to uncertainty of what zones or regions of the wellbore are producing water. Techniques are desired for detecting the water-producing zones so appropriate action can be taken.

Sometimes, the production of water cannot be isolated or stopped without expensive intervention to squeeze cement into perforations or to squeeze conformance gels into the matrix. This requires setting packers and/or placement with coiled tubing. These procedures are time consuming and expensive.

To remedy water-influx and/or coning, U.S. Pat. No. 3,719,228 discloses a method of treating a subterranean formation containing hydrocarbons and brine to stimulate the production of hydrocarbons. In accordance with this method, a pre-flush composition comprising an aqueous solution of rosin soap and fatty acid soap is injected into the formation. The pre-flush reacts with connate brine to produce a precipitate that blocks the brine-bearing passages. The pre-flush composition does not react with hydrocarbons, thereby allowing hydrocarbon-bearing passages to remain open.

Another method is disclosed in U.S. Pat. No. 4,617,132. In accordance with this method, a sandstone formation is first contacted with an aqueous solution containing a water-soluble anionic polymer having a molecular weight greater than 100,000. Then, the anionic polymer is contacted with a fluid containing a water-soluble cationic polymer having a molecular weight greater than 1,000. As a result of the contact of the anionic with the cationic polymer, coacervation occurs between the two polymers which reduces the amount of the anionic polymer removed from the formation by fluids produced therefrom. The presence of stabilized polymer in the formation reduces the water/oil ratio by reducing the permeability of the formation to water in the wellbore area.

U.S. Pat. No. 5,146,986 discloses another method of selectively reducing the permeability of a subterranean formation. The formation is contacted with a hydrocarbon carrier liquid containing a surface active agent. The surface active agent is believed to adsorb on the walls of the interstitial passages in the formation, as a result of which, the flow of water through the passages is reduced.

U.S. Pat. No. 5,150,754 discloses a method of selectively injecting into a hydrocarbon-bearing zone a petroleum mixture capable of forming a solid gel that degrades over a designated period of time. Then, an aqueous gel-forming mixture is injected into a water influx zone of the formation. Upon degradation of the first gel, production of hydrocarbons can continue.

Another method, disclosed in U.S. Pat. No. 5,203,834, comprises the steps of injecting into a well a gas, a polymer composition capable of forming a foamed gel with the gas, and a delayed gel degrading agent capable of opening pathways in the gel.

Furthermore, K. E. Thomson and H. S. Fogler published in SPE Production and Facilities, May 1995, pp. 130-137, a proposed method that uses an injection backflow and shut-in procedure, as well as a slow-reacting silica based diverting agent. The backflow step is described as a miscible displacement of the agent before the onset or completion of the gelation.

U.S. Pat. No. 6,803,348 issued to Jones et al. and U.S. Pat. No. 6,920,928 issued to Davies et al. disclose hydrophobically modified polymers for water control and methods of using these polymers in water control. These patents are assigned to the present assignee and are incorporated by reference in their entirety. The polymers disclosed in these patents are based on polymers having side chains that can be cross-linked with chromium(III), zirconium(IV), or organic cross linkers (e.g., hexanal) in aqueous environments, but not in hydrocarbon environments.

While these prior art methods have been successfully used to control water production, there remains a need for simpler and more convenient methods for controlling water production in a well and methods for removing water in a well.

SUMMARY OF INVENTION

In one aspect, embodiments relate to differential filters. A differential filter in accordance with one embodiment of the invention includes a swellable polymer that swells after contacting water such that permeability of the differential filter is reduced and water is removed.

In another aspect, embodiments relate to methods for controlling water production in a well. A method in accordance with one embodiment of the invention includes deploying a differential filter downhole; and performing a downhole operation, wherein the differential filter comprises a swellable polymer that swells after contacting water such that permeability of the differential filter is reduced and water is removed.

Other aspects will be apparent from the following description and the appended claims.

DETAILED DESCRIPTION

Figure 1:
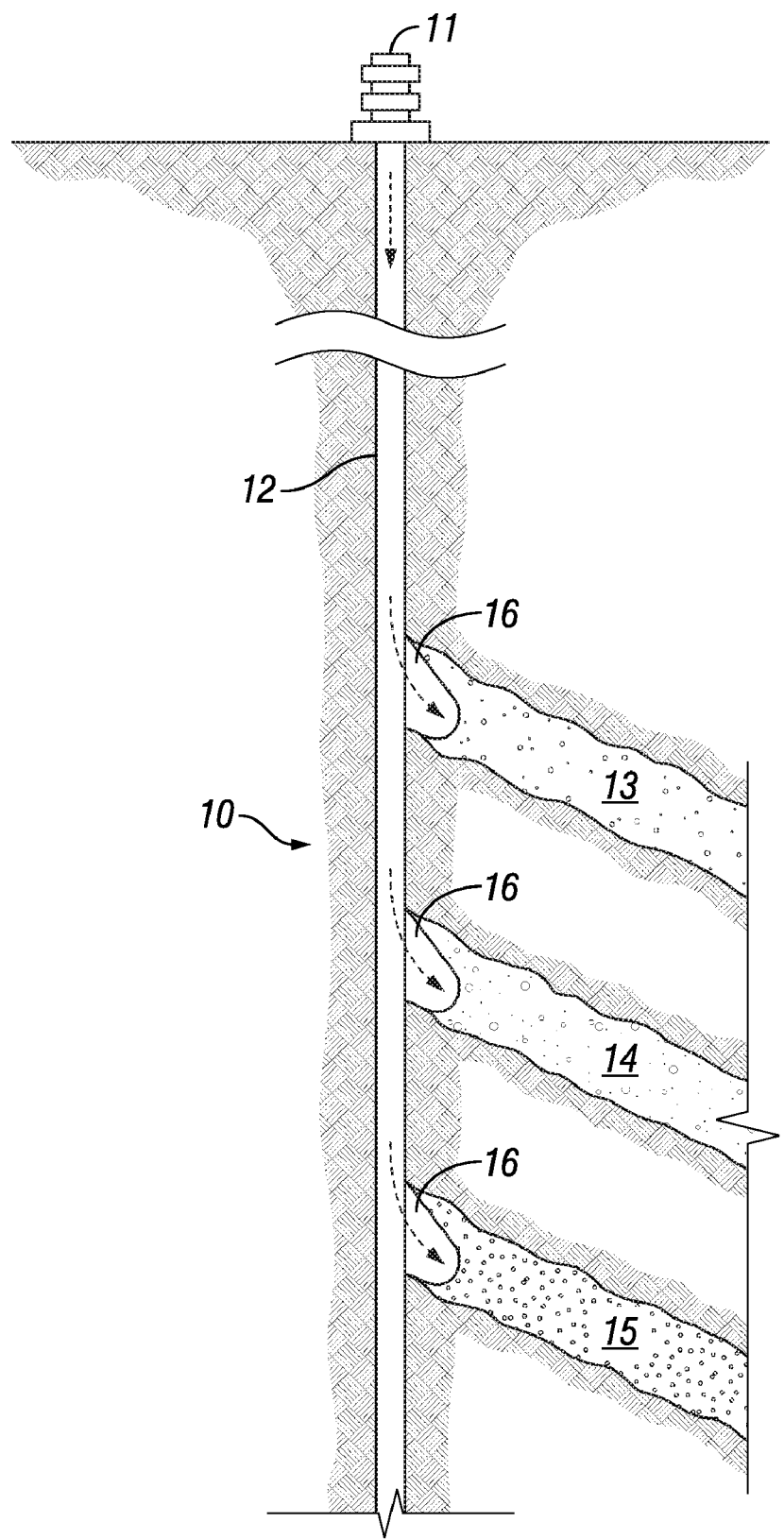
FIG. 1 shows a schematic of a producing well having three zones and a fluid in accordance with one embodiment where fluid is pumped downhole to block water production.

Embodiments relate to differential filters that have differential permeabilities to water versus hydrocarbons. These filters may be porous particulate filters. Accordingly, the permeabilities of these filters change after contacting water. Specifically, these particulate filters become less permeable after contacting water, reducing or preventing the passage of water. On the other hand, the permeabilities of these filters are not substantially reduced when they encounter hydrocarbons (oil or gas). Therefore, these particulate filters will not impede the passage of the hydrocarbons. Also, these filters can be used to remove partially or totally water in the well. These filters, which can selectively allow the passage of hydrocarbons and retard the passage of water, may be referred to as "differential filters."

The following will describe embodiments with some detail, which is intended for illustration only and not intended to limit the scope of the overall invention. In addition, it should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventor have possession of the entire range and all points within the range.

In accordance with some embodiments, the differential filters may comprise a mixture of solid "matrix" type particles mixed with swellable polymer particles. The swellable particles may be evenly mixed in the pack (mixture). As oil is produced through the filter media, there would be no reduction in filter permeability. When water is produced through the filter, the water swellable beads will expand to reduce the filter permeability. Thus, the filters may function to block or limit water production downhole.

In accordance with some embodiments, the matrix particulates are inert to oil, gas, or water. Any inert particulates known in the art may be used. For example, the matrix particles may be normal or light weight gravels, glass beads, ceramics, walnut shells, or the like. The matrix particles can also be any type of resin coated gravels or proppants, or polymeric beads (non-swelling). Examples of polymeric matrix materials, for example, may include semi-crystalline polymers, such as polyethylene, polypropylene, crosslinked thermosetting polymers, or thermoplastic polymers.

In accordance with some embodiments, inert matrix particles may comprise polymer particles that can be "welded" together by exposing them to another reagent. Examples of such polymer particles may include poly(L-lactide) (PLA) and polystyrene beads or particulates. These polymer beads can be welded together (or agglomerated) by exposing them to an organic solvent. The agglomerates of these polymer particles may provide some strength to the structure of a filter. In operation, a mixture including such polymer matrix may be pumped down a well to form a downhole pack in either the wellbore or perforations. This would be followed with a post flush of a solvent. The post flush would chemically "spot weld" the particle pack into a porous one piece filter. This is discussed below in the examples.

In accordance with some embodiments, the differential filters may comprise matrix type particles coated with swellable polymer. The swellable polymer coating will expand and reduce the permeability of the filters, leading to reduced passage of water (hence, reduced production of water). On the other hand, hydrocarbons may not substantially expand the swellable polymer coating. As a result, hydrocarbons can pass through the filters and the production of hydrocarbons is not substantially affected. Therefore, these filters may function downhole to block or limit water production.

In accordance with some embodiments, the differential filters may comprise water-swellable polymers. These water-swellable polymers may be used alone or in combination with other agents commonly used in downhole operations. For example, these water-swellable polymers may be mixed with proppants in a fracturing fluid, or with gravel for gravel packing operations.

The water swellable beads in accordance with some embodiments, for example, may include polyacrylic acid (PAA), polymethacrylic acid (PMA), poly maleic anhydride, polyvinyl alcohol (PVOH), low-viscosity latex, or a polymer similar to the types used in swellable diapers. Also, the beads may include polyethylene oxide, polypropylene oxide, polyoxymethylene, polyvinyl methyl ether, polyethylene imide, polyvinyl alcohol, polyvinyl pyrrolidone, polyethylene imine, polyethylene sulfonic acid, polysilicic acid, polyphosphoric acid, polystyrene sulfonic acid, polyvinylamine, natural water soluble polymers, guar derivatives, cellulose derivatives, xanthan, chitosan, diutan, and any suitable copolymers or mixtures thereof. These types of beads comprise polymers that are crosslinked to prevent them from dissolving in the water. These polymers fall into a class of polymers known as polyelectrolites. Non-polymeric swellable beads may also be used in accordance with some embodiments, for example, but not limited to, inorganic materials such as sodium bentonite or even silica-gel. Furthermore, the swellable particles could also be made of an inert particle (ceramic, metal, or polymeric) with a coating layer of crosslinked swellable polymeric material (e.g., PAA, PMA, and the like). Mechanistically, the swellable beads would swell and block the pores of the filter when water was produced through it.

In some embodiments, the swellable beads may comprise polymers that include functional groups that can be hydrolyzed by water and the hydrolysis product can swell in water. Examples of such polymers may include crosslinked polyvinyl acetate or other polymers having hydrolysable functional groups (such as lactones, lactams, imides, anhydrides, thiolactones, thioanhydrides, etc.). In the presence of water, the ester functional groups of the polyvinyl acetate would hydrolyze to form polyvinyl alcohol (PVOH), which would swell in the water. Other modified PVOH may include copolymers of PVOH and another ester, such as methyl methacrylate. Examples of such modified PVOH polymers are described in U.S. Pat. No. 5,137,969, issued to Marten et al. (Col. 5, lines 1-11). Some of these modified PVOH are sold by Celanese Chemicals (Dallas, Tex., U.S.A.) under the trade name of Vytek™.

In addition to PVOH, swellable beads based on polymers having hydrolysable functional groups may be based on other polymers, such as polyamides, polyesters, latex or the like. Latexes suitable for such purposes (e.g., low-viscosity latexes) are available from Hexion Specialty Chemicals (Columbus, Ohio, U.S.A.). Latex can be made synthetically by polymerizing a monomer that has been emulsified with surfactants. For example, U.S. Pat. No. 5,175,205 discloses the preparation of low viscosity latex. The latex disclosed in this patent is synthesized from copolymerizable monomer having at least one terminal alkene ($CH_2=C<$) group. Such monomers are preferably alkyl esters of acrylic or methacrylic acid, and the latex may be synthesized from one monomer or combinations of monomers. After polymerization, the polymer may be used as is or the ester groups on the polymer may be partially hydrolyzed to give carboxylated polymers, which are low viscosity latex. The hydrolysis of the esters can be controlled to any desired extent 10% or 20%) such that the latex still has hydrolysable ester groups, which will be hydrolyzed by water. Upon hydrolysis, the latex will have poly carboxylic side chains, which may function like the polyelectrolites.

The particle sizes of the matrix beads and the swellable beads may be any sizes that are suitable for the intended use. For example, if these beads are intended to be placed into fractures, smaller particle sizes will be preferred. On the other hand, if these beads are intended to form filters in the wellbore, large particle sizes may be used. In general, the filter beads or particulates of the invention may have sizes (also known as average diameters) ranging from about 10 mesh (average size of about 2 mm or less) to about 1000 mesh (average size of about 10 microns or less), for example about 20 mesh (average size of about 940 microns or less), about 40 mesh (average size of about 350 microns or less), about 60 mesh (average size of about 250 microns or less), about 80 mesh (average size of about 160 microns or less), about 100 mesh (average size of about 1200 microns or less), about 200 mesh (average size of about 60 microns or less), and the like. However, particles outside of this range may also be used. One of ordinary skill in the art would know what sizes are proper for the desired jobs. For example, bead pack filter for use with gravel packing preferable are of similar sizes of gravel pack materials, which may be 24, 40, or 60 mesh for example. Using larger sized particles may help reduce the capillary forces that occur in mixed water oil flows, or when a water back flows into a formation that has been producing oil. On the other hand, smaller mesh sizes may be used in downhole tools, such as the MDT.

In accordance with some embodiments, the particulate filters may include other features to provide information on water production in a wellbore. For example, the swellable beads may be loaded before use with a chemical tracer that will diffuse out of the bead and be released when the beads encounter water. Different tracers can be placed in beads, which are distributed in pre-packed screens. Tracers in the beads will indicate what zones of the wellbore are experiencing water inflow. Water or oil samples collected from the wellbore may be further analyzed to ascertain the source of the water without the need to run a downhole tool.

As discussed above, there are several mechanisms that can cause water to be produced in a well. Embodiments may be used to reduce or limit water production regardless of the mechanisms that cause the water production. FIG. 1 illustrates one such scenario. As shown in FIG. 1, a producing well 10 includes a wellhead 11 and a wellbore 12. The wellbore 12 penetrates three permeable layers 13, 14, 15 in the formations. Among these layers, layers 13, 15 produce hydrocarbons, while layer 14 produces water.

In accordance with some embodiments, a treatment fluid 16 may be pumped from surface with or without mechanical isolation (packers). The treatment fluid 16 may be a non-aqueous fluid that includes one or more particulate filters. Alternatively, the treatment fluid 16 may be an aqueous fluid, in which particulates may be suspended as encapsulated particles. The encapsulation may dissolve or decompose under downhole conditions (e.g., high temperatures or high pressures). Once pumped downhole, the treatment fluid 16 may invade all open zones (e.g., layers 13, 14, 15). The particulate filters in the treatment fluid 16 will encounter oil or water in different zones. When these particulate filters encounter water (e.g., in layer 14) the swellable polymer in the filters will expand, leading to reduced permeability of the filters. As a consequence, water production from layer 14 will be reduced or prevented.

On the other hand, these particulate filters entering layers 13 and 15 will encounter hydrocarbons. The water-swellable polymer will not expand much (or at all) when it encounters the hydrocarbons. Thus, the particulate filters in layers 13 and 15 will substantially maintain their original permeability. Therefore, the production of hydrocarbons will not be impeded. On the other hand water will be removed from the well.

In the above description, the particulate filters are pumped downhole in a fluid 16. Alternative methods of deployment of particulate filters may include dropping the particulate filters as tablets, sticks, or other solid forms. These particulate filter beads may be encapsulated with a material such as polylactic acid, polyglycolic acid, copolymers of polylactic acid and polyglycolic acid, or even a low melting point wax, such as paraffin, montan, camphor or polyethylene waxes, where the waxes would melt at well temperatures exposing the swellable particle, or any suitable mixture of aforementioned materials, such the material(s) are degradable under downhole conditions (e.g., high temperature) or can be easily degraded by addition of another reagent. Many of these encapsulating materials, such as is the case with camphor, are not necessarily water soluble, but rather oil soluble. By using the particles in conjunction with oil soluble materials, the encapsulated particles may be pumped into the wellbore via a water based carrying fluid, and during petroleum production, the particles become activate by removal of the oil soluble encapsulant.

The procedures described above illustrate one application among many possible applications of embodiments. Other applications, for example, may include the following.

The particulate filters, for example, may be used with gravel pack mixtures. The gravel pack mixtures may be used in open-hole wells. In such an application, a swellable polymer (beads or particulates) may be pumped with gravel or lightweight gravel as in a normal gravel packing operation. The swellable polymer beads may be provided as encapsulated particulates. The encapsulation will dissolve or degrade downhole. In this application, the swellable polymer need not be mixed with matrix particulates before use because the gravels can function like the matrix particulates. However, swellable polymers premixed with other matrix particulates may also be used.

In the gravel packing application, if the well starts to produce water at one place, such as the heel, the swellable beads will swell and stop the water production. Other positions along the wellbore would continue to produce oil or gas through the gravel pack. This would prevent costly interventions to stop the water production.

Similarly, particulate filters may also be used with pre-packed screens (e.g., sand control screens) containing a mixture of normal gravels or resin-coated gravels and swellable polymer beads. The advantages of using these filters in such applications are similar to those described above for the gravel packing operation.

In another application, mixtures of normal and water swellable beads may be pumped downhole into perforations. Then, these beads are set in place by an over flush of a solvent to "spot weld" the normal polymer beads in place. In this application, the beads are those that can be welded by a solvent, such as PLA and polystyrene described above.

Particulate filters may also be used with fracture mixtures that include proppants. In this application, swellable beads, which may be encapsulated, may enter the fractures with the proppants. The swellable beads in the fractures will prevent production of water from zones that intersect the fracture. Water zones intersecting the production zone could occur when fractures are not contained within the producing zone, or when a zone waters out. Other zones intersecting the fracture and producing gas or oil would produce normally.

Particulate filters may also be used as downhole temporary filters, which allow the production of gas and oil to pass. However, the temporary filters will prevent water from entering the production line when water is produced through them. The temporary filters may be prepared from a mixture of water swellable beads and PLA beads. The PLA beads may be welded or sintered together to form an agglomerate, support structure. The PLA agglomerate may degrade over time downhole. Alternatively, a suitable reagent (such as calcium carbonate, magnesium oxide, sodium hydroxide, and the like, by non-limiting example), may be added to speed up the degradation of the PLA agglomerate, when the temporary filter is no longer needed.

Particulate filters may also be used as downhole permanent filters, which allow the produced gas and oil to pass, but would not allow water to be produced through them. These filters can contain inert beads (resin coated proppants or other materials, sintered ceramic or plastic beads) mixed with water swellable beads. These downhole filters, whether temporary or permanent, could be installed in downhole tools (such as the multi-dynamic fluid testing tool (MDT) from Schlumberger), downhole motors, pumps, or even within packer elements.

Polyacrylamide (and some related copolymers) can absorb about 20-30 times or more (relative to the polyacrylamide weight) of water weakly bonded to the polyacrylamide, and may lose the water at about 140° C. or above. Polyacrylamide can tightly bond about same weight (relative to the polyacrylamide weight) of water, and will lose the water at about 350° C. When enough polyacrylamide (or the copolymers) is used, the water can be bonded to the polyacrylamide as the tightly-bonded water, which will be more stable at higher temperature (about 350° C.). The downhole filters made of the polyacrylamide and the copolymers could be installed in downhole tools (such as the multi-dynamic fluid testing tool from Schlumberger), downhole motors, pumps, or even within packer elements. These downhole filters can also be used to bond and remove water at relatively high temperatures, for example, at about 350° C.

According to a further aspect, compositions for use in oil chambers of tools are disclosed. Some embodiments relate to tools having hydraulic oils that can avoid adverse effects of water leaking into hydraulic chambers. One aspect relates to methods for protecting a tool. Some embodiments relate to compositions and methods for avoiding or minimizing problems associated with water leakage into hydraulic chambers of tools. Some embodiments may be used by themselves or be used together with other solutions known in the art for avoiding adverse effects due to water leakage into the tools. Some embodiments are based on the ability of acrylamide polymers and copolymers to stably bond leaked water in the hydraulic oils.

The acrylamide polymer/copolymer particles can be pumped into a fracture with oil (since the acrylamide polymer/copolymer will not dissolve in the oil), and dropped to the bottom of the fracture. The (crude) oil can flow through the acrylamide particles without problem. When the reservoir starts to run out of oil and the formation water is moving up in the fracture, the acrylamide polymer/copolymer particles will absorb water, expand, and stick together, thus reducing or even stopping water production.

The following describes several examples to illustrate embodiments. These examples are for illustrative purpose only. One of ordinary skill in the art would appreciate that these examples are not exhaustive and they are not intended to limit the scope of the invention.

EXAMPLES

The ability of differential filters of the invention to differentially pass hydrocarbons and block water passage is illustrated in the following experiments. In the first experiment, poly(L-lactide) (PLA) beads of about 20 mesh size were mixed with super-absorbent particles (such as "Terra-sorb" particles of approximately 40 mesh) at a ratio of 5:1 by weight. Terra-sorb, a cross-linked potassium polyacrylamide-acrylate copolymer, is commonly used in gardening for soil treatment and is available from many suppliers. The resulting bead mixture was poured into the stem of a glass funnel and solidified (i.e., spot weld the PLA beads) with an acetone flush, which agglomerates PLA beads. This process was performed separately for two different funnels. In a third funnel, the process was repeated except that the bead pack contained only PLA beads, i.e., without any super-absorbent particles.

In the third funnel, when water was added to the funnel above the agglomerated PLA bead pack, water was found to freely drain through the pack, indicating that the pack was permeable and open to water flow. In the second funnel, a light mineral oil of about 5 cP viscosity was added above the bead pack. This oil was also found to flow through the bead pack, indicating that the pack was permeable to oil, even though the super-absorbent material was interspersed in the pack. In the first funnel, water was added above the bead pack containing the PLA beads and super-absorbent particles. No water was seen to flow through the bead pack, even after more than 24 hours. The super-absorbent material in the bead pack swelled upon contact with water and sealed off the permeability of the pack.

A similar experiment was performed using syringes instead of funnels. The same bead pack mixtures were prepared in three syringes. It was found that the bead pack with super-absorbent material did not pass water, even with some light pressure (approximately 10 psi) applied by the plunger. These experiments clearly show that filters made with super-absorbent materials in the bead pack were selective filters that passed oil, but not water.

Figure 2:
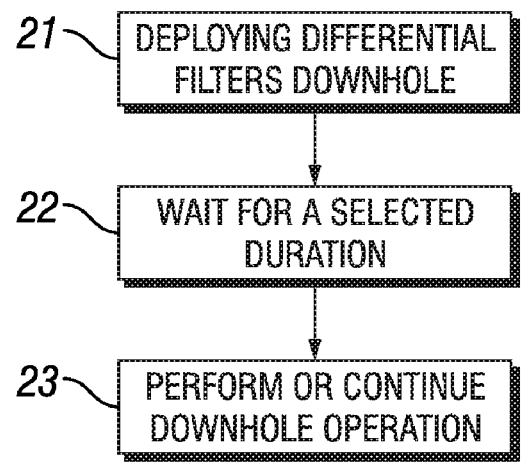
FIG. 2 shows a flow chart illustrating a method in accordance with one embodiment for preventing water production in a well.

The above examples demonstrate that the differential filter of the invention can create a selectively permeable pack that controls produced water, by at least substantially shutting off fluid production as the level of produced water becomes undesirable. As these differential filters are usable in many different applications, the precise manner of how these should be used would certainly depend on the specific applications. FIG. 2 shows a flow chart illustrating a general process of how the filters of the invention may be applied.

As shown in FIG. 2, in a typical application, differential filters of the invention are deployed downhole (step 21). Depending on the types of the operations to be performed downhole, the filters may be deployed with the fluid that is being pumped, for example. Other methods of deployment may include inclusion of the filters on a tool to be deployed downhole. Note that differential filters of the invention may comprise soluble polymer in a relative amount ranging from about 1% to about 100% with respect to the total weight of the particles (i.e., the sum of matrix particles and swellable particles). Next, one may optionally wait for a duration for the filters to react with water (step 22). This wait may or may not be necessary, depending on the downhole operations and also on the types of swellable materials. For example, with a swellable material that swells upon encountering water, there is no wait required. On the other hand, if the swelling depends on hydrolysis of certain functional groups (e.g., anhydride, ester, etc.), then some time may be needed for hydrolysis to take effect. After the filters are in place, the downhole operation may be performed or continues (step 23).

Figure 3:
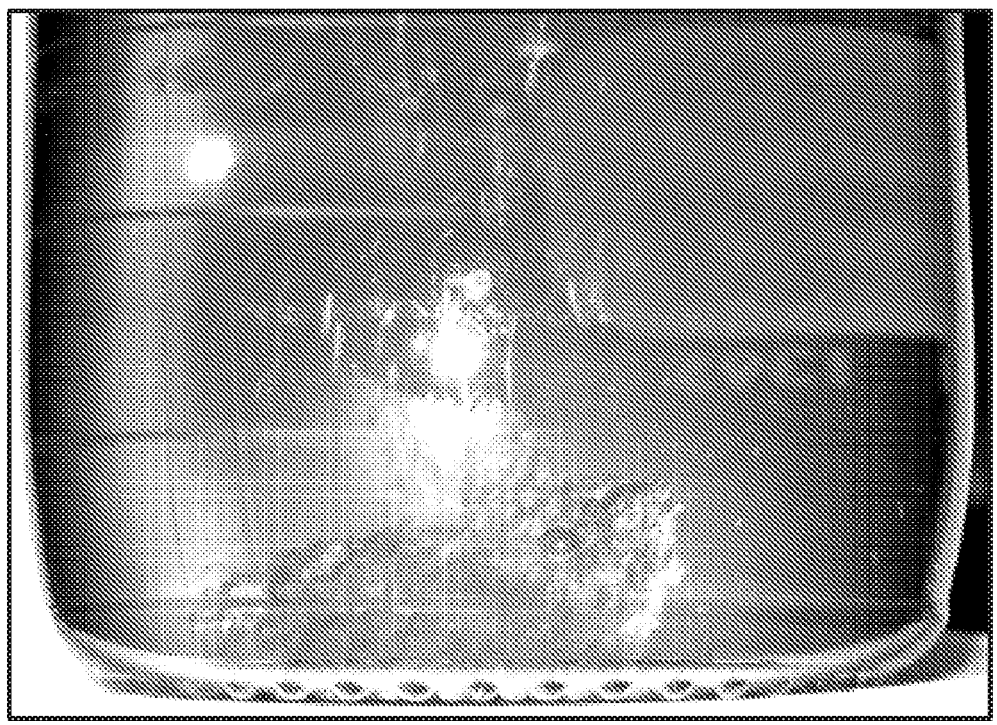
FIG. 3 shows polyacrylamide particles absorb water in diesel, and swell and stick together.

In a further example, 1 mL of water was added to 200 mL of diesel in a bottle, the water just beaded up at the bottom of the bottle. When 0.5 g of polyacrylamide particles (relative molecular mass Mr: 5-6 million, nonionic) was added to 200 mL of diesel, the polyacrylamide just precipitated to the bottom without being dissolved or swollen by the diesel. However, when 0.5 g of the polyacrylamide particles and 1 mL of water were together added to 200 mL of diesel, and shaken for several seconds, there were no water beads at the bottom. Instead, the polyacrylamide particles were swollen (with water) and glued together as shown in FIG. 3. The binding force between water and polyacrylamide is expected to be much stronger than the stabilizing force offered by alternative methods such as micelles, and therefore, should be able to endure higher temperature without releasing the bonded water. Similar phenomena were also observed for some acrylamide copolymers such as acrylamide sodium acrylate copolymer.

Embodiments of the invention may have one or more of the following advantages. The differential filters are effective in preventing the passage of water, but not hydrocarbons. Therefore, they can be used in a well to reduce or prevent water production. No a priori knowledge is needed regarding where the water is being produced. These filters can be easily deployed; no special equipment is required. These filters can be deployed without interruption of normal well operations, saving time and costs. These filters can include tracers (markers) to inform which zones are producing water in a well.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for removing at least a partial amount of water in a well, the method comprising:
deploying a differential filter downhole; and
performing a downhole operation;
wherein the differential filter comprises a swellable polymer that swells after contacting water such that permeability of the differential filter is reduced by removing said partial amount of water, the swellable polymer being non-soluble in the water and/or hydrocarbon and wherein the swellable polymer comprises at least one selected from the group consisting of polyacrylic acid, polyacrylate, polymethacrylic acid, poly maleic anhydride, polyacrylamide, polyvinyl alcohol, latex, polyamide, polyester, and any co-polymer thereof, and
wherein the differential filter is disposed on a device for deployment downhole.

2. The method of claim 1, wherein the well has a temperature greater than 250° C.

3. The method of claim 1, wherein the well has a temperature greater than 300° C.

4. The method of claim 1, wherein the water is produced water.

5. The method of claim 1, wherein the swellable polymer comprises a polymer having a functional group that can be hydrolyzed by water.

6. The method of claim 1, further comprising matrix particles.

7. The method of claim 6, wherein the matrix particles comprise at least one selected from the group consisting of gravels, glass beads, ceramics, walnut shells, resin-coated gravels, resin-coated proppants, and polymeric beads.

8. The method of claim 6, wherein the swellable polymer is coated on the matrix particles.

9. The method of claim 6, wherein the matrix particles comprises at least one selected from the group consisting of poly(L-lactide), polystyrene, crosslinked thermosetting polymers, and thermoplastic polymers.

10. The method of claim 1, wherein the differential filter is combined with fluid for downhole use.

11. The method of claim 10, wherein the fluid for downhole use is one selected from the group consisting of a gravel packing fluid and a fracturing fluid.

12. The method of claim 1, wherein the device for deployment downhole is one selected from a screen for sand control, a packer, a completion string, and a service tool.

13. The method of claim 1, wherein the device is in a bag structure.

14. A method for removing at least a partial amount of water in a well, the method comprising:
deploying a differential filter downhole; and
performing a downhole operation;
wherein the differential filter comprises a swellable polymer that swells after contacting water such that permeability of the differential filter is reduced by removing said partial amount of water, the swellable polymer being non-soluble in the water and/or hydrocarbon and able not to release said partial amount of water at a temperature below 300° C., and wherein the swellable polymer comprises at least one selected from the group consisting of polyacrylic acid, polyacrylate, polymethacrylic acid, poly maleic anhydride, polyacrylamide, polyvinyl alcohol, latex, polyamide, polyester, and any co-polymer thereof, wherein the differential filter further comprises matrix particles and the swellable polymer is coated on the matrix particles.

15. The method of claim 14, wherein the swellable polymer does not release said partial amount of water at a temperature below about 300° C.

16. The method of claim 14, wherein the swellable polymer comprises at least one selected from the group consisting of polyacrylic acid, polyacrylate, polymethacrylic acid, poly maleic anhydride, polyacrylamide, polyvinyl alcohol, latex, polyamide, polyester, and any co-polymer thereof.

17. The method of claim 14, wherein the swellable polymer comprises a polymer having a functional group that may be hydrolyzed by water.

18. The method of claim 14, wherein the matrix particles comprise at least one selected from the group consisting of gravels, glass beads, ceramics, walnut shells, resin-coated gravels, resin-coated proppants, and polymeric beads.

19. The method of claim 14, wherein the matrix particles comprises at least one selected from the group consisting of poly(L-lactide), polystyrene, crosslinked thermosetting polymers, and thermoplastic polymers.

20. The method of claim 19, further comprising passing a solvent through the matrix particles to agglomerate the matrix particles.

21. A method comprising:
deploying a differential filter in a downhole tool; and
performing a downhole operation;
wherein the differential filter comprises a swellable polymer that swells after contacting water such that permeability of the differential filter is reduced by removing said partial amount of water, the swellable polymer being non-soluble in the water and/or hydrocarbon, and able not to release said partial amount of water at a temperature below 300° C., wherein the swellable polymer comprises at least one selected from the group consisting of polyacrylic acid, polyacrylate, polymethacrylic acid, poly maleic anhydride, polyacrylamide, polyvinyl alcohol, latex, polyamide, polyester, and any co-polymer thereof.

* * * * *